(12) United States Patent
Ramsey (10) Patent No.: US 8,577,875 B2
(45) Date of Patent: Nov. 5, 2013

(54) PRESENTING SEARCH RESULTS ORDERED USING USER PREFERENCES

(75) Inventor: William D. Ramsey, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 787 days.

(21) Appl. No.: 12/408,580

(22) Filed: Mar. 20, 2009

(65) Prior Publication Data
US 2010/0241624 A1   Sep. 23, 2010

(51) Int. Cl.
*G06F 17/30* (2006.01)
(52) U.S. Cl.
CPC .... *G06F 17/30696* (2013.01); *G06F 17/30864* (2013.01)
USPC ............................ 707/723; 707/669; 707/748
(58) Field of Classification Search
CPC .................... G06F 17/30696; G06F 17/30864
USPC ......... 707/715, 723, 732, 640, 669, 748, 749, 707/750; 706/12, 52
See application file for complete search history.

(56) References Cited

U.S. PATENT DOCUMENTS

| | | | | |
|---|---|---|---|---|
| 6,363,377 | B1* | 3/2002 | Kravets et al. | 707/723 |
| 7,574,436 | B2* | 8/2009 | Kapur et al. | 707/723 |
| 7,689,615 | B2* | 3/2010 | Burges et al. | 707/723 |
| 8,015,170 | B2* | 9/2011 | Badros et al. | 707/706 |
| 2001/0051940 | A1* | 12/2001 | Soulanille | 707/669 |
| 2003/0208474 | A1* | 11/2003 | Soulanille et al. | 707/669 |
| 2006/0064411 | A1 | 3/2006 | Gross | |
| 2006/0074883 | A1 | 4/2006 | Teevan | |
| 2006/0136404 | A1* | 6/2006 | Soulanille | 707/669 |
| 2006/0195440 | A1 | 8/2006 | Burges | |
| 2006/0206476 | A1 | 9/2006 | Kapur | |
| 2007/0208730 | A1 | 9/2007 | Agichtein | |
| 2007/0260597 | A1 | 11/2007 | Cramer | |
| 2008/0215553 | A1 | 9/2008 | Badros | |
| 2009/0112853 | A1* | 4/2009 | Nishizawa et al. | 707/723 |
| 2010/0131500 | A1* | 5/2010 | van Leuken et al. | 707/723 |

OTHER PUBLICATIONS

Using Clickthrough Data to Improve Web Search Rankings http://www.dbis.ethz.ch/education/ss2007/07_dbs_algodbs/ZimmerliReport.pdf.
Improving Web Search Ranking by Incorporating User Behavior Information http://research.microsoft.com/en-us/um/people/sdumais/SIGIR2006-fp345-Ranking-agichtein.pdf.

* cited by examiner

*Primary Examiner* — Shahid Alam
(74) *Attorney, Agent, or Firm* — Shook, Hardy & Bacon L.L.P.

(57) ABSTRACT

Systems and methods for presenting search results ordered, at least in part, based upon indicated user preferences are provided. User preferences for one potential search result over another that are free of position bias are obtained utilizing random relative order interchange of juxtaposed, ranked search results. Upon receipt of a search query, a determination is made to present at least a portion of search results satisfying the received query ordered based on user preferences, whether or not the order coincides with that determined using a ranking algorithm. In this way, presented search results are ordered, at least in part, according to user preferences, thus improving the relevance of the output relative to standard ranking algorithms alone.

21 Claims, 8 Drawing Sheets

PRESENTING SEARCH RESULTS ORDERED USING USER PREFERENCES

BACKGROUND

Typically, search engines rank search results for received search queries utilizing a number of criteria. For instance, a search engine may, for a given search result webpage, analyze the number of keywords from the search query contained in the webpage, the number of other web pages that link to the webpage, the number of links contained in the webpage, the number of times the webpage has been selected from a search results page, etc. This analyzed data may then be utilized by a ranking algorithm to rank the webpage relative to other search result web pages and present a ranked search result listing.

BRIEF SUMMARY

Embodiments of the present invention relate to systems and methods for obtaining user preference data free of positional bias and ordering search results for presentation, at least in part, according to this position-bias-free data. Upon receipt of a keyword-based search query, search results are determined that are ranked according to a ranking algorithm. To obtain position-bias-free data, a determination is then made to interchange two of the juxtaposed search results. Some users are presented with the search results according to their original rankings, while other users are presented with the interchanged search results. User preferences are gathered when users select one of the two search results. Interchanging the two search results eliminates the positional bias of having one search result consistently ranked above the other. After enough user preference data has been obtained such that sufficient confidence exists in the superiority of one result over the other, the interchanging of this specific pair of search results may be discontinued and the superior search result may be consistently presented above the inferior search result when the same, or a substantially similar, search query is received. This process may be undertaken for different search result pairs, resulting in ordering of search results dictated, at least in part, by user preferences.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems and methods for obtaining user preference data free of position bias and ordering search results for presentation according, at least in part, to this position-bias-free data. Upon receipt of a keyword-based search query, search results are determined that are ranked according to a ranking algorithm. To obtain position-bias-free data, a determination is then made to interchange two of the juxtaposed search results. Some users are presented with the search results according to their original rankings, while other users are presented with the interchanged search results. User preferences are gathered when users select one of the two search results. Interchanging the two search results eliminates the positional bias of having one search result consistently ranked above the other. After enough user preference data has been obtained such that sufficient confidence exists in the superiority of one result over the other, the interchanging of this specific pair of search results may be discontinued and the superior search result may be consistently presented above the inferior search result when the same, or a substantially similar, search query is received. This process may be undertaken for different search result pairs, resulting in ordering of search results dictated, at least in part, using user preferences.

Accordingly, in one embodiment, the present invention provides one or more computer-storage media storing computer-usable instructions that, when executed by a computing-device, perform a method for presenting search results ordered using user preference data. The method includes receiving a search query and generating a ranked list of search results in response to the search query, the ranked list of search results comprising a first search result and a second search result. The method further includes obtaining position-bias-free user preference data for the first and second search results, ordering the first and second search results relative to each other based on the position-bias-free user preference data obtained to create a modified list of search results, and presenting at least a portion of the modified list of search results, the portion including at least one of the first and second search results.

In another embodiment, the present invention provides a method for presenting search results ordered using user preference data. The method comprises the steps of: receiving a search query; generating a ranked list of search results in response to the search query in a first computer process and providing the ranked list of search results to a second computer process, the ranked list of search results comprising a first search result and a second search result; determining to interchange the first search result and the second search result in a second computer process and providing the determination to a third computer process; interchanging the first search result and the second search result in the third computer process to create a modified list of search results; and presenting the modified list of search results. The method further includes receiving a user indication of interest, the user indication of interest being associated with either the first search result or the second search result; storing a token in a database, the token being associated with the user indication of interest; and iteratively repeating the previous steps. The method still further includes ordering the first search result and the second search in a fourth computer process based on analyzing the stored token to create an ordered list of search results; receiving a second search query, the subsequent search query being the same as the received search query; and presenting the first search result and the second search result in response to the second search query in accordance with the ordered list of search results.

In yet another embodiment, the present invention provides one or more computer-storage media storing computer-usable instructions that, when executed by a computing-device, perform a method for presenting search results ordered using user preferences. The method comprises the steps of: receiving a first search query in a first search session, the first search query comprising a search term; utilizing a ranking algorithm to generate a ranked list of search results in response to the first search query, the ranked list of search results comprising a first search result and a second search result; utilizing a computer to determine to interchange the first search result and the second search result; utilizing the computer to interchange the first search result and the second search result to create a modified list of search results; and presenting at least a portion of the modified list of search results. The method further includes receiving a first user indication of interest, the first user indication of interest being associated with either the first search result or the second search result presented in accordance with the modified list of search results; storing a first token in a database, the first token being associated with the first user indication of interest; receiving a second search query in a second search session, the second query comprising the search term; generating the ranked list of search results in response to the second search query; and presenting at least a portion of the ranked list of search results. Still further, the method includes receiving a second user indication of interest, the second user indication of interest being associated with either the first search result or the second search result presented in accordance with the ranked list of search results; storing a second token in the database, the second token being associated with the second user indication of interest; ordering the first search result and the second search result based on analyzing the first token and the second token to create an ordered list of search results; and presenting at least one of the first search result and the second search result in accordance with the ordered list of search results.

Having briefly described an overview of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Figure 1:
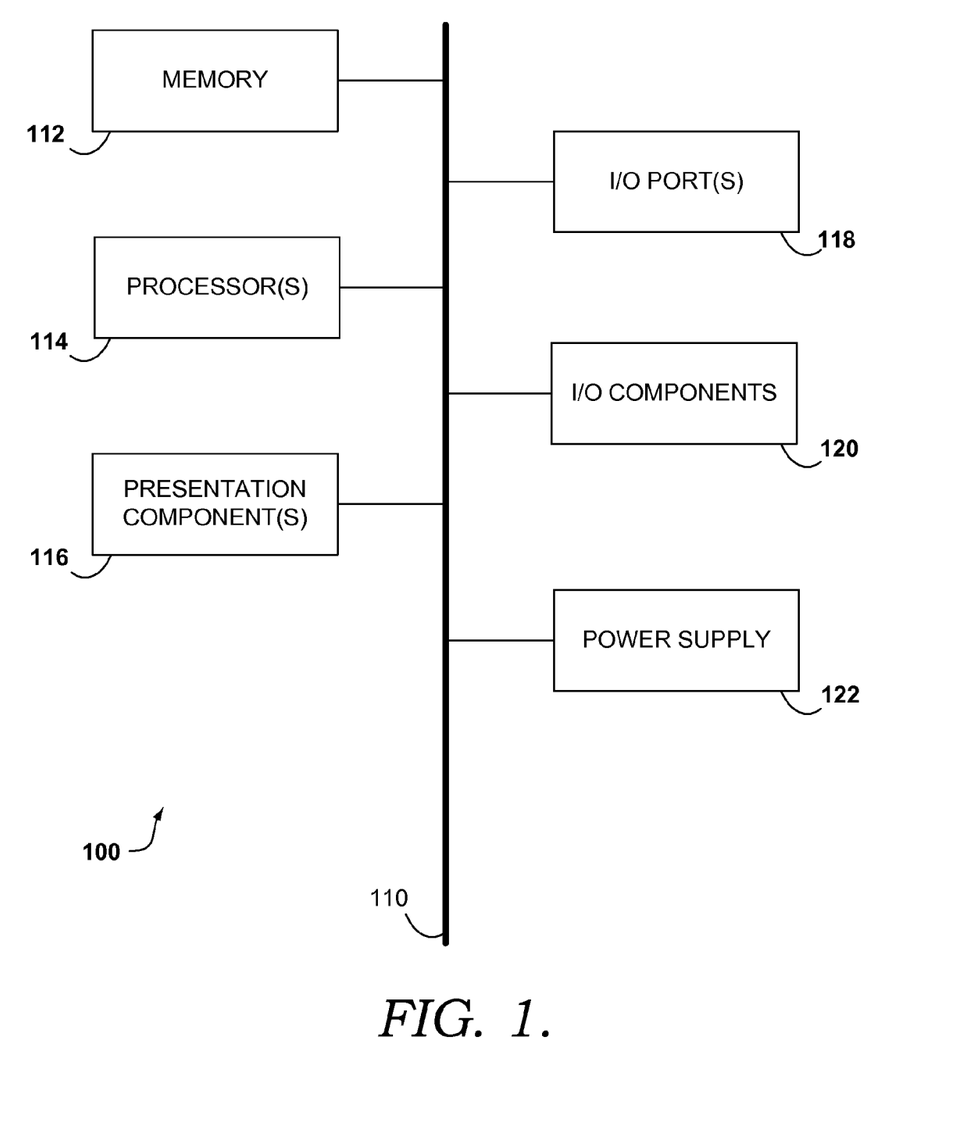
FIG. 1 is a block diagram of an exemplary computing environment suitable for use in implementing embodiments of the present invention.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventor hereof recognizes that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
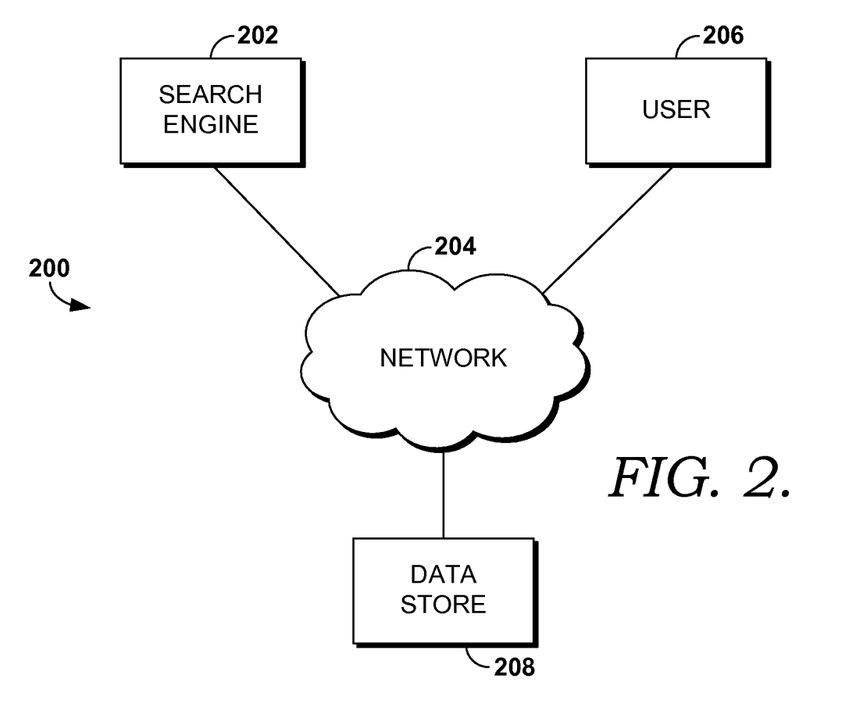
FIG. 2 is a block diagram of an exemplary computing system suitable for obtaining user preferences and presenting search results respectively ordered utilizing user preferences, in accordance with an embodiment of the present invention.

Embodiments of the present invention relate to systems and methods for obtaining position-bias-free user preferences and utilizing obtained position-bias-free user preferences to order search results. Turning now to FIG. 2, a block diagram is illustrated, in accordance with an embodiment of the present invention, showing an exemplary computing system 200 configured to obtain and utilize position-bias-free user preference data to order search results. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes a user device 206, a search engine 202, and a data store 208, all in communication with one another via a network 204. The network may include, without limitation, one or more local area networks (LANs) and/or wide area networks (WANs). Such networking environments are commonplace in offices, enterprise-wide computer networks, intranets and the Internet. Accordingly, the network 216 is not further described herein.

The data store 208 is configured to store information related to position-bias-free user preferences. In various embodiments, such information may include, without limitation, tokens associated with user indications of interest, the relative position of pairs of search results when user indications of interest were obtained, a search query associated with the user indications of interest, the number of user indications of interest obtained, and the like. In embodiments, the data store 208 is configured to be searchable for one or more of the items or tokens stored in association therewith. It will be understood and appreciated by those of ordinary skill in the art that the information stored in the data store 208 may be configurable and may include any information relevant to search queries, user preferences, tokens, etc. The content and volume of such information are not intended to limit the scope of embodiments of the present invention in any way. Further, though illustrated as a single, independent component, data store 208 may, in fact, be a plurality of data stores, for instance, a database cluster, portions of which may reside on the user device 206, the search engine 202, another external computing device (not shown), and/or any combination thereof.

Each of the user device 206 and the search engine 202 shown in FIG. 2 may be any type of computing device, such as, for example, computing device 200 described above with reference to FIG. 2. By way of example only and not limitation, each of the user device 206 and the search engine 202 may be a personal computer, desktop computer, laptop computer, handheld device, mobile handset, consumer electronic device, and the like. Additionally, the user device 206 may further include a keyboard, keypad, stylus, joystick, and any other input-initiating component that allows a user to provide wired or wireless data to the network 204, e.g., search queries, web page addresses, and the like. It should be noted, however, that the present invention is not limited to implementation on such computing devices, but may be implemented on any of a variety of different types of computing devices within the scope of embodiments hereof.

The user device 202 is configured to receive search queries input by a user (e.g., utilizing a keypad, mouse, or the like) and to transmit such search queries, via network 204, to the search engine 202. In turn, the search engine 202 is configured to receive the input search queries. The user device 202 is further configured to receive user indications of interest in a particular search result (e.g., utilizing a keypad, mouse, camera, or the like), as more fully described below, and transmit such user indications of interest, via network 204 to the search engine 202. In turn, the search engine 202 is configured to receive the user indications of interest.

The search engine 202 is further configured to generate ranked lists of search results that satisfy a received search query, for instance, utilizing at least one ranking algorithm stored in association therewith. The search engine 202 is further configured to determine to interchange the members of one or more pairs of search results with respect to one another, to interchange the members of one or more pairs of search results to create a modified list of search results, to analyze tokens indicative of user indications of interest (user preference data) that are stored, for instance, in association with data store 208, to interchange the members of one or more pairs of search results in accordance with user preference data to create ordered lists of search results, and to transmit ranked, modified, and/or ordered lists of search results through network 204 for presentation, for instance, on a display device associated the user device 206. Each of these functions is described more fully below with respect to FIGS. 3-10.

Figure 3:
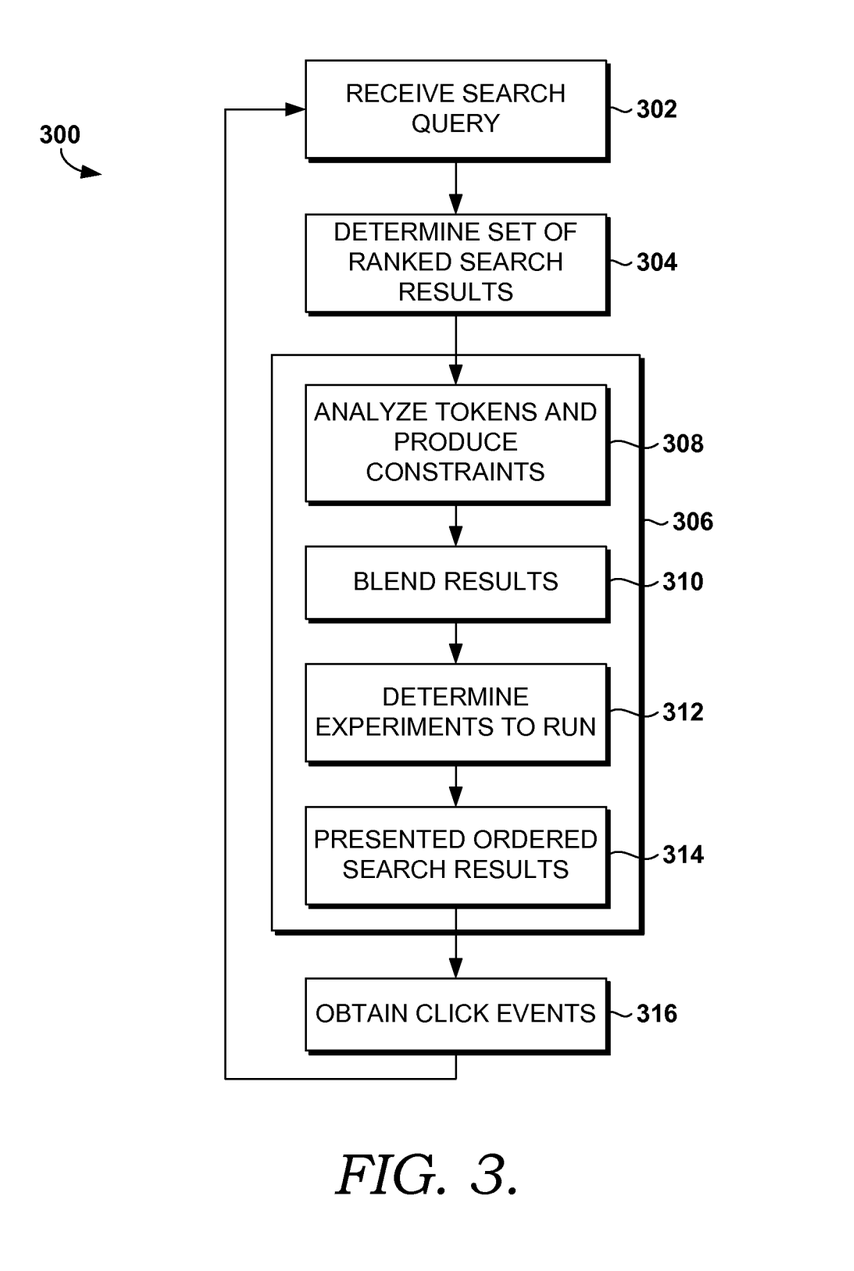
FIG. 3 is a flow diagram showing a method for obtaining and utilizing position-bias-free user preferences for ordering search results, in accordance with an embodiment of the present invention.

Turning now to FIG. 3, a flow diagram is illustrated that shows a method 300 for obtaining and utilizing position-bias-free user preferences for ordering search results. Initially, as indicated at block 302, a search query is received (e.g., at search engine 202 from user device 206 through network 204 of FIG. 2). The search query is analyzed (e.g., by search engine 202 of FIG. 2) and a list of search results is determined. The list is then analyzed (e.g., by a ranking algorithm associated with search engine 202 of FIG. 2) and a ranked list of the search results is determined. This is indicated at block 304. The ranking algorithm generally ranks the list of search results according to various criteria to produce the ranked list of search results. These criteria may include, for example, relevancy criteria, number of links, popularity, etc. This ranked list of search results has an order, such that there is a search result ranked first, a search result ranked second, etc. Two search results ranked consecutively—such as a search result ranked fourth and a search result ranked fifth—may be said to be juxtaposed within the ranked list of search results. A search result ranked first may be said to be ranked higher than a search result ranked second. It should be noted that ranked search results may be presented vertically according to their ranked order, such that the search result ranked first is positioned higher than a search result ranked second. Ranked search results could also be presented horizontally according to their ranks, or presented in an order not corresponding to their rank.

At block 306, user preferences are obtained and analyzed. As indicated at block 308, tokens indicating user preferences are analyzed to determine a set of constraints to be imposed on various search results. For example, the search result ranked by the ranking algorithm as fifth and the search result ranked by the ranking algorithm as tenth may have enough associated tokens to determine that users prefer the search result ranked tenth to the search result ranked fifth. The constraint then becomes that the search result ranked tenth by the ranking algorithm should be ordered higher than the search result ranked fifth. This constraint may be used to override the rankings generated by the ranking algorithm such that user preferences, at least in part, dictate the ordering of the search results for presentation. The search results ordered according to user preferences and the search results without enough data to order according to user preference may be blended together in a blended ordered list of search results, as shown at block 310. This blended ordered list of search results may have search results ranked by the ranking algorithm interspersed with search results ordered according to user preference. For example, the search result ranked tenth by the ranking algorithm will be ordered higher than the search result ranked fifth by the ranking algorithm, but may have a number of search results interspersed between it and the search result ranked fifth by the ranking algorithm.

As indicated at block 312, it is determined whether to run an experiment on any juxtaposed pairs of search results in the blended ordered list of search results and what pairs of search results on which to run any experiments. For example, it may be determined to run an experiment on the first search result and the second search result within the blended ordered list of search results. Running experiments obtains position-bias-free user preferences by changing the order of juxtaposed pairs of search results within a blended ordered list of search results. For example, users may preferentially select search results positioned towards the top of the display screen. This may cause difficulties in determining user preferences for search results because search results presented towards the top of the screen will consistently obtain more user selections. By interchanging the positions of various pairs of search results, position-bias-free user preferences may be obtained.

It should be noted that temporal-bias free user-preferences may also be obtained by use of embodiments in accordance with the present invention. For example, in standard search settings, user-preference data may be influenced by temporal-bias in that a certain search result may consistently appear towards the top of a search results list. Over time, the quality of that particular search results may degrade, or the quality of a lower-ranked search result may improve, such that users would prefer the lower-ranked search result over the higher-ranked search result. If the search results were ranked simply by the number of clicks generated, the higher ranked result might maintain its higher ranking only by virtue of having started out at a higher-ranked position. Thus, there may be an inherent temporal-bias in rankings when one page has been ranked prior to another page. By probabilistically interchanging the positioning of neighboring search results, this temporal bias can be overcome as each search result may be evaluated with respect to each position. After enough data has been gathered, the inferior but higher-ranked search result can be moved to a position determined by user-preference, free of both temporal and positional bias.

The experiments may be run on different pairs of juxtaposed search results. Running the experiments on juxtaposed search results allows for minimal degradation of the quality of the search result rankings. To run experiments, different juxtaposed pairs of search results may be chosen. For example, the first and second search results may be a first pair, the third and fourth search results may be a second pair, and so on. (This example is more fully explained below with reference to FIGS. 6A and 6B.) In another example, the first search result may maintain its original ranking, while the second and third search results may be the first pair, the fourth and fifth search results may be a second pair, and so on. (This example is more fully explained below with reference to FIGS. 7A and 7B.) The ranking of the search results in each pair of search results may be interchanged such that the ordering of interchanged pairs, as presented, differs from that which would be dictate utilizing the ranking algorithm alone. For example, if the second and third search results are considered a pair, their order within the blended ordered list of search results could be interchanged. Determining whether to interchange the search results making up a pair of search results may be probabilistic. By probabilistic, in this context, it is meant that there is an element of probability used in the determination. This probability may utilize randomness or pseudo-randomness to make the determination. For example, the ordering of the first pair of search results may be interchanged with fifty percent probability, allowing an approximately equal number of experiments to be conducted having each search result in each position. The interchanging could also alternate such that with each experiment the ordering of each pair will be interchanged from that of the previous experiment. Interchanging the ordering of search results within pairs, and therefore the page position of these search results, allows user preferences to be determined free of positional bias.

As indicated at block 314, the blended ordered list of search results is presented. This blended ordered list may be oriented such that the results are presented towards the top of a display screen, towards the left of the display screen, paginated, etc. Of course, there are many ways in which to display ranked and/or ordered lists of search results in accordance with embodiments of the present invention.

As indicated at block 316, user indications of interest are obtained. For example, a user may select one search result one of a presented search result pair. Alternatively, the user may hover over or near a search result with the cursor. A user's gaze might be observed, perhaps by a camera or other means, and could indicate user interest in a particular search result. The listing of these user indications of interest is illustrative and not limiting. A token associated with the user indication of interest may be stored in a database. The token may include, for example, which search result was selected, which pair the search result was a part of in an experiment, the relative position of the pair of search results on the screen, and the like. The user preferences obtained may be utilized in subsequent iterations of the illustrated method when the same, or a substantially similar, search query is subsequently received.

Figure 4A:
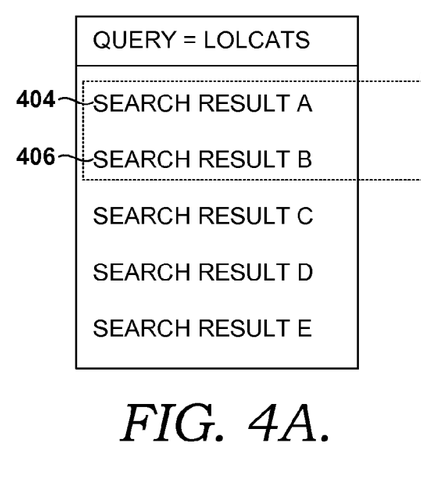
FIG. 4A is an illustrative screen display, in accordance with an embodiment of the present invention, of an exemplary user interface showing a search result list on a single search engine results page.
Figure 4B:
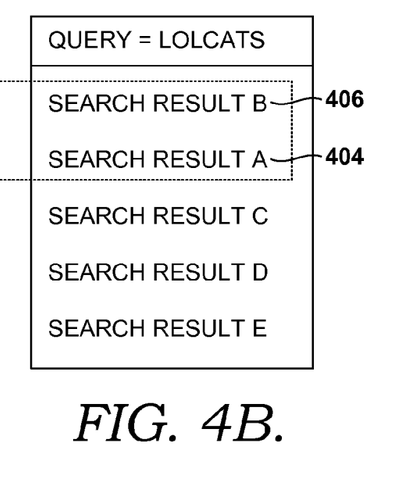
FIG. 4B is an illustrative screen display, in accordance with an embodiment of the present invention, of an exemplary user interface showing a modified search result list having an interchanged search result pair on a single search engine results page, the search result pair being interchanged relative to the listing shown in FIG. 4A.

With reference now to FIG. 4A, an exemplary user interface showing an illustrative display of a search result list on a single search engine results page is shown and designated generally as reference number 400. In the illustrated example, the search query received is "lolcat." The ranked search result list generated includes search result A 404, search result B 406, search result C, search result D, and search result E. Search result A 404 and search result B 406 are the first search result pair 402. In FIG. 4B, the order of the first search result pair 402 has been interchanged, such that search result B 406 is now ranked higher than search result A 404. In an embodiment in accordance with the present invention, search result pair 402 may be probabilistically determined to be interchanged with fifty percent probability, such that approximately fifty percent of search engine users are presented with a search engine results page similar for FIG. 4A, while approximately fifty percent of search result users are presented with a search engine results engine page similar to FIG. 4B. Thus, user indications of interest can be obtained with each search result in the higher relative position. Repeatedly conducting experiments generates position-bias-free user preferences for the search results. In certain embodiments, certainty of the user preferences can be assessed by analyzing, among other things, the number of experiments conducted.

Figure 5A:
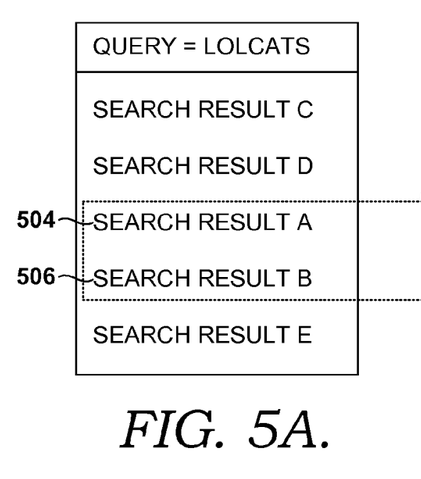
FIG. 5A is an illustrative screen display, in accordance with an embodiment of the present invention, of an exemplary user interface showing a search result list on a single search engine results page.
Figure 5B:
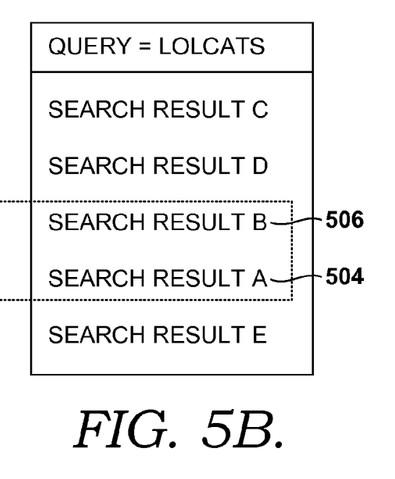
FIG. 5B is an illustrative screen display, in accordance with an embodiment of the present invention, of an exemplary user interface showing a modified search result list having an interchanged search result pair on a single search engine results page, the search result pair being interchanged relative to the listing shown in FIG. 5A.

Turning now to FIG. 5A, an exemplary user interface showing an illustrative display of a search result list on a single search engine results page is shown and designated generally as reference number 500. In the illustrated example, the search query received is "lolcat." The blended ordered search list generated includes search result C, search result D, search result A 504, search result B 406, and search result E. Search result A 504 and search result B 506 are the second search result pair 502. In FIG. 5B, the order of the second search result pair 502 have been interchanged, such that search result B 506 is now ranked higher than search result A 504. In an embodiment in accordance with the present invention, search result pair 502 may be alternately interchanged, such that every other user is presented with a search results page similar to FIG. 5A, while the remaining users are presented with a search engine results engine page similar to FIG. 5B.

Figure 6A:
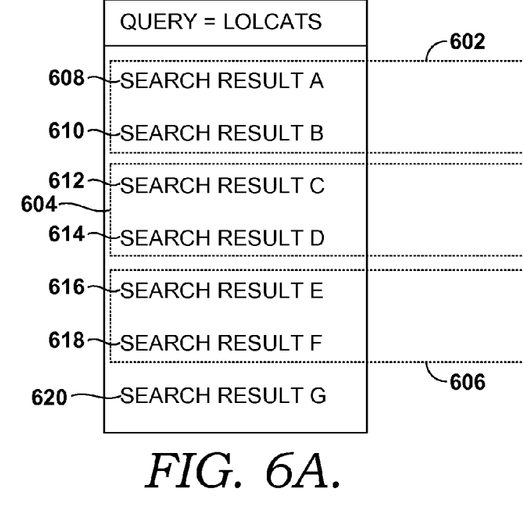
FIG. 6A is an illustrative screen display, in accordance with an embodiment of the present invention, of an exemplary user interface showing a search result list on a single search engine results page.
Figure 6B:
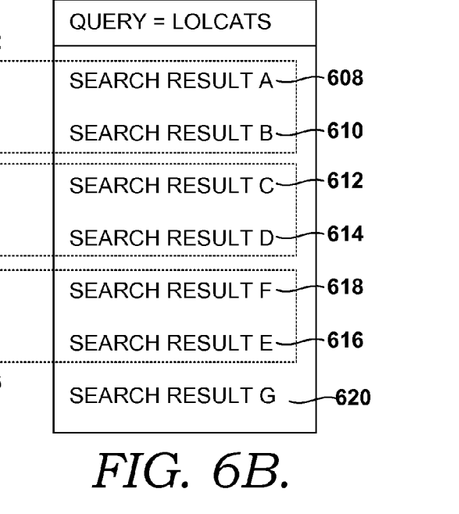
FIG. 6B is an illustrative screen display, in accordance with an embodiment of the present invention, of an exemplary user interface showing a modified search result list with a multiple interchanged search result pairs on a single search engine results page, each interchanged search result pair being interchanged relative to the listing shown in FIG. 6A.

With reference now to FIG. 6A, an exemplary user interface showing an illustrative display of a search result list on a single search engine results page is shown and designated generally as reference number 600. In the illustrated example, the search query received is again "lolcat." The blended ordered search list generated includes search result A 608, search result B 610, search result C 612, search result D 614, search result E 616, search result F 618, and search result G 620. Search result A 608 and search result B 610 are the first search result pair 602, search result C 612 and search result D 614 are the second search result pair 604, and search result E 616 and search result F 618 are the third search result pair 606. FIG. 6B shows the display screen after experiments are determined to be run on the pairs of search results. In this experiment, the search results constituting each pair of search results have been interchanged with fifty percent probability. The ordering of the first search result pair 602 has not been interchanged, the order of the second search result pair 604 has also not been interchanged, but the order of the third search result pair 606 has been interchanged, such that search result F 618 is now ranked higher than search result E 616. Utilizing probabilistic determinations to interchange search result pairs allows each search engine user to be presented with lists of search results having a mix of interchanged and non-interchanged search result pairs. This in turn allows experiments to be conducted on various pairs of search results to obtain position-bias-free user preferences.

User indications of interest for the search results can thus be obtained while having each search result of each search result pair in the higher and lower relative position. Repeatedly conducting experiments may thus generate position-bias-free user preferences for the search results because data can be collected with each search result in each relative position (i.e., 1655 user indications of interest may be obtained while a first search result is in the third position and a second search result is in the fourth position, and 1136 user indications of interest may be obtained while a first search result is in the fourth position and a second search result is in the third position). In certain embodiments, certainty of the user preferences can be assessed by analyzing, among other things, the number of experiments conducted. It should be noted that, in certain embodiments, experiments may have been conducted a quantity of times such that it is not necessary to interchange a pair of search results. For example, if a high number of experiments had been conducted on the first pair of search results 602 such that user preferences have been determined with sufficient confidence (i.e., out of 30,000 experiments, users preferred search result A 608 ninety-seven percent of the time to search result B 610), the search results may be presented according to their user preference (i.e., in this case, search result A 608 ranked consistently higher than search result B 610) decreasing the necessity for further experiments.

Figure 7A:
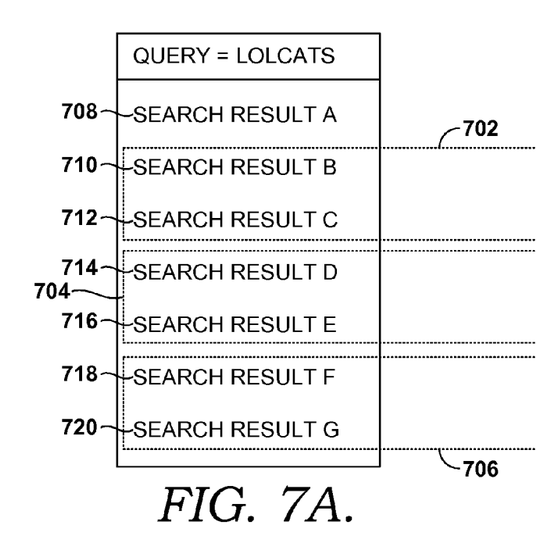
FIG. 7A is an illustrative screen display, in accordance with an embodiment of the present invention, of an exemplary user interface showing a search result list on a single search engine results page, wherein the juxtaposed pairs are identified utilizing differing criteria from that shown in FIG. 6A.
Figure 7B:
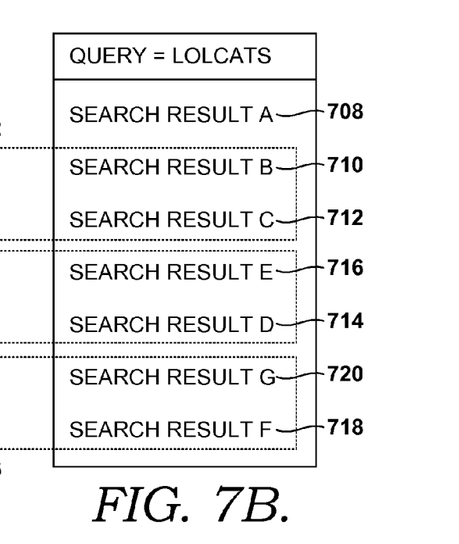
FIG. 7B is an illustrative screen display, in accordance with an embodiment of the present invention, of an exemplary user interface showing a search result list with a multiple interchanged search result pairs on a single search engine results page, each interchanged search result pair being interchanged relative to the listing shown in FIG. 7A.

With reference now to FIG. 7A, an exemplary user interface showing an illustrative display of a search result list on a single search engine results page is shown and designated generally as reference number 700. In the illustrated example, the search query received is again "lolcat." The blended ordered search list generated includes search result A 708, search result B 710, search result C 712, search result D 714, search result E 716, search result F 718, and search result G 720. The pairings in this instance begin with search result B 710 and search result C 712, skipping search result A 708. Search result A 708 is thus in this case is not included in a pair. Search result B 710 and search result C 712 are the first search result pair 702, search result D 714 and search result E 716 are the second search result pair 704, and search result F 718 and search result G 720 are the third search result pair 706. FIG. 7B shows the display screen after experiments are determined to be run on the pairs of search results. In this experiment, the search results constituting each pair of search results have been interchanged with fifty percent probability. The order of the first search result pair 702 has not been interchanged, the order of the second search result pair 704 has not been interchanged, and the order of the third search result pair 706 has been interchanged.

Figure 8:
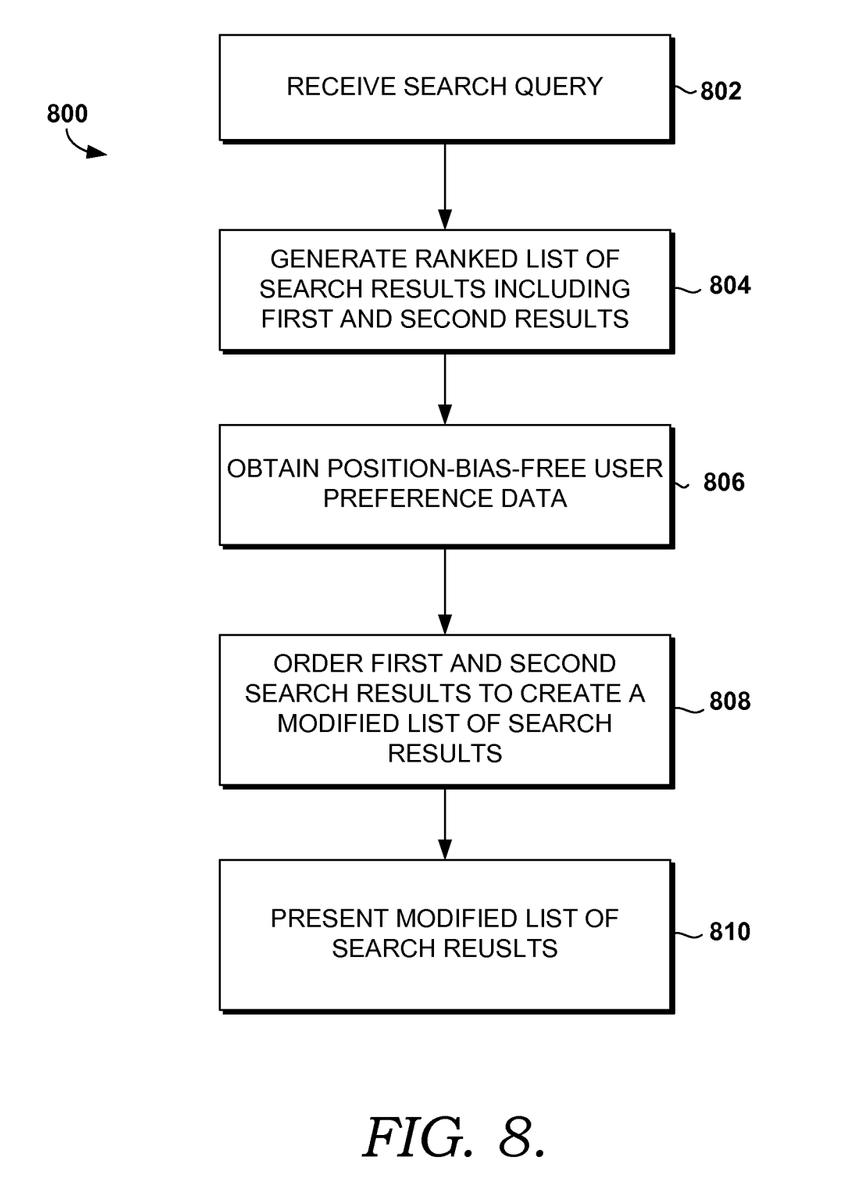
FIG. 8 is a flow diagram illustrating a method for presenting search results ordered, in part, using user preferences, in accordance with an embodiment of the present invention.

Turning now to FIG. 8, a flow diagram is illustrated that shows a method 800 for presenting search results ordered, in part, utilizing user preference data, in accordance with an embodiment of the present invention. As indicated at block 802, a search query is received (for instance, by search engine 202 of FIG. 2). A ranked list of search results is generated that satisfy the received search query, as indicated at block 804 (e.g., by search engine 202 of FIG. 2). The ranked list of search results includes at least a first search result and a second search result positioned for presentation with respect to one another as indicated by at least one ranking algorithm. As indicated at block 806, position-bias-free user preference data is obtained for the first and second search results (e.g., from data store 208 of FIG. 2). As indicated at block 808, it is determined, e.g., by search engine 202 of FIG. 2, to order the first and second search results relative to each other for presentation based on the position-bias-free user preferences. This creates as modified list of search results. At least a portion of the modified list of search results, including at least one of the first and second search results, is presented, e.g., on a display screen associated with user device 206 of FIG. 2, as shown at block 810.

Position-bias-free user preferences for a pair of search results may be obtained as indicated at block 806, for example, by conducting experiments as detailed in above examples, wherein search result pairs are probabilistically interchanged and presented, wherein user indications of interest are received, and wherein tokens associated with user indications of interest are stored. Search result A and search result B may be juxtaposed in a ranked list of search results, for example, in response to the search query "lolcat." In an embodiment, search result A and search result B may be considered a search result pair for the purpose of experiments in the context of this search query. An experiment is conducted, wherein these two search results are probabilistically interchanged approximately fifty percent of the time, such that fifty percent of users submitting the search query "lolcat" receive a ranked list of search results wherein search result A is ranked above search result B, and wherein the remaining fifty percent of users receive a ordered list of search results wherein search result B is ordered above search result A. User indications of interest associated with each of these search results in each list are obtained and analyzed to obtain position-bias-free user preference. For example, 1000 users may be shown search result A ranked above search result B. Of these, 600 click on search result A and 100 click on search result B. Also in this example, 1000 users may be shows search result B ordered above search result A. Of these, 400 click on search result B and 400 click on search result A. Thus there have been 2000 trials, an equal number with search result A ranked than search result B and with search result B ordered higher than search result A. Out of these 2000 trials, search result A received 1000 clicks, while search result B received 500 clicks. By interchanging this pair of results in the lists of search results presented to users, position-bias has been diminished if not eliminated, and it can be determined that users prefer search result A to search result B approximately two to one.

It should be noted that the number of times search result A is presented in a search result listing higher than search result B need not be identical, as statistical methods can be applied to determine user preference for each of these search results. For example, search result A might be presented ranked higher than search result B approximately seventy-five percent of the time in a first scenario, while search result B might be ordered higher that search result A approximately twenty-five percent of the time in a second scenario. Approximately 7500 sessions thus might present search results according to the first scenario, and approximately 2500 sessions might present search results according to the second scenario. In the first scenario, perhaps fifty-percent of the user indications of interest obtained are associated with search result A, while the remaining fifty-percent of user indications of interest obtained are associated with search result B. In the 2500 sessions which present search results according to the second scenario, perhaps eighty-percent of user indications of interest are associated with search result B, while approximately twenty-percent of user indications of interest are associated with search result A. From these user indications of interest, it can be seen that users seem to prefer search result B to search result A.

It should further be noted that a number of methods exist for obtaining position-bias-free user preferences, including methods that interchange not just pairs of search results but triples of search results, quadruples of search results, etc. For example, a search result list comprising search result triple search result A, search result B, and search result C may be generated. It may be determined to conduct an experiment on this search result triple to obtain position-bias-free user preferences for this triple. For example, these search results may be in the following initial relative ranking order: search result A in a first position, search result B in a second position, and search result C in a third position. A first set of experiments may be conducted utilizing this ordering to obtain user preferences for each search result when in this initial position. A second set of experiments may be conducted on these search results when in a second ordering. For example, this search result triple may be reordered such that search result A is in the third position, search result B is in the first position, and search result C is in the second position. User preferences for these search results when in this ordering may be obtained. Finally, a third set of experiments may be conducted on these search results when in a third ordering. For example, this search results triple may be reordered such that search result A is in the second position, search result B is in the third position, and search result C is in the first position. User preferences for each of these search results while in this position may be obtained. Each of these search results can be seen to have occupied a position relative to each other within the list of search results. The first position, second position, and third position described above are not necessarily adjacent to each other, but such adjacent ordering may prove advantageous in allowing for experiments to be conducted with a minimum of degradation in user experience. User preferences for each of these search results can thus be obtained and position bias can be filtered to give position-bias-free search results for use in position-bias-free ordering of search results.

Continuing on with the above example, a search query for "lolcats" is received, as shown at block 802. In response, a ranked list of search results is be generated, as shown at block 804. This ranked list of search results may be generated, for example, by a ranking algorithm utilizing neural networks, Bayesian networks, keyword matching algorithms, link weighting algorithms, etc. This ranked list of search results will include both the first and second search results. Position-bias-free user preference data is obtained for the first and second search results (for instance, as described above with respect to block 806)—in this example search result A and search results B. It is determined to order this pair of search results relative to each other based on the position-bias-free user preferences. This determination may be made based on the confidence in the experimental results—that there were 2000 experiments and user preferred search result A 1300 times out of 2000. The pair of search results, search result A and search result B, may then be ordered according to the position-bias-free user preference, as shown at block 808. In this example, since users expressed a preference for search result A over search result B, search result A will be ordered higher than search result B for presentation, creating a modified list of search results. Search result A being ordered higher than search result B is a constraint on these search results. The modified list of search results, in which search result A is ordered higher than search result B based on position-bias-free user preference data, is presented, as shown at block 810.

It should be noted at this point that the modified list of search results created at block 808 is not necessarily comprised of the same search results as the ranked list of search results generated at block 804. For example, it may be determined that, based on position-bias-free user preferences, a search result that was not included within the ranked list of search results generated at block 804 would be useful to the user. This search result may be advantageously present within the modified list of search results created at block 808. The modified list of search results created at block 808 may thus comprise one or more search results that were not included within the ranked list of search results generated at block 804. Similarly, it may be determined that, based on position-bias-free user preferences, a search result that was present within the ranked list of search results generated at block 804 would not be useful to the user. This search result may be advantageously excluded from the modified list of search results created at block 808. Thus, the modified list of search results created at block 808 may not include a search result that was included within the ranked list of search results generated at block 808.

Figure 9:
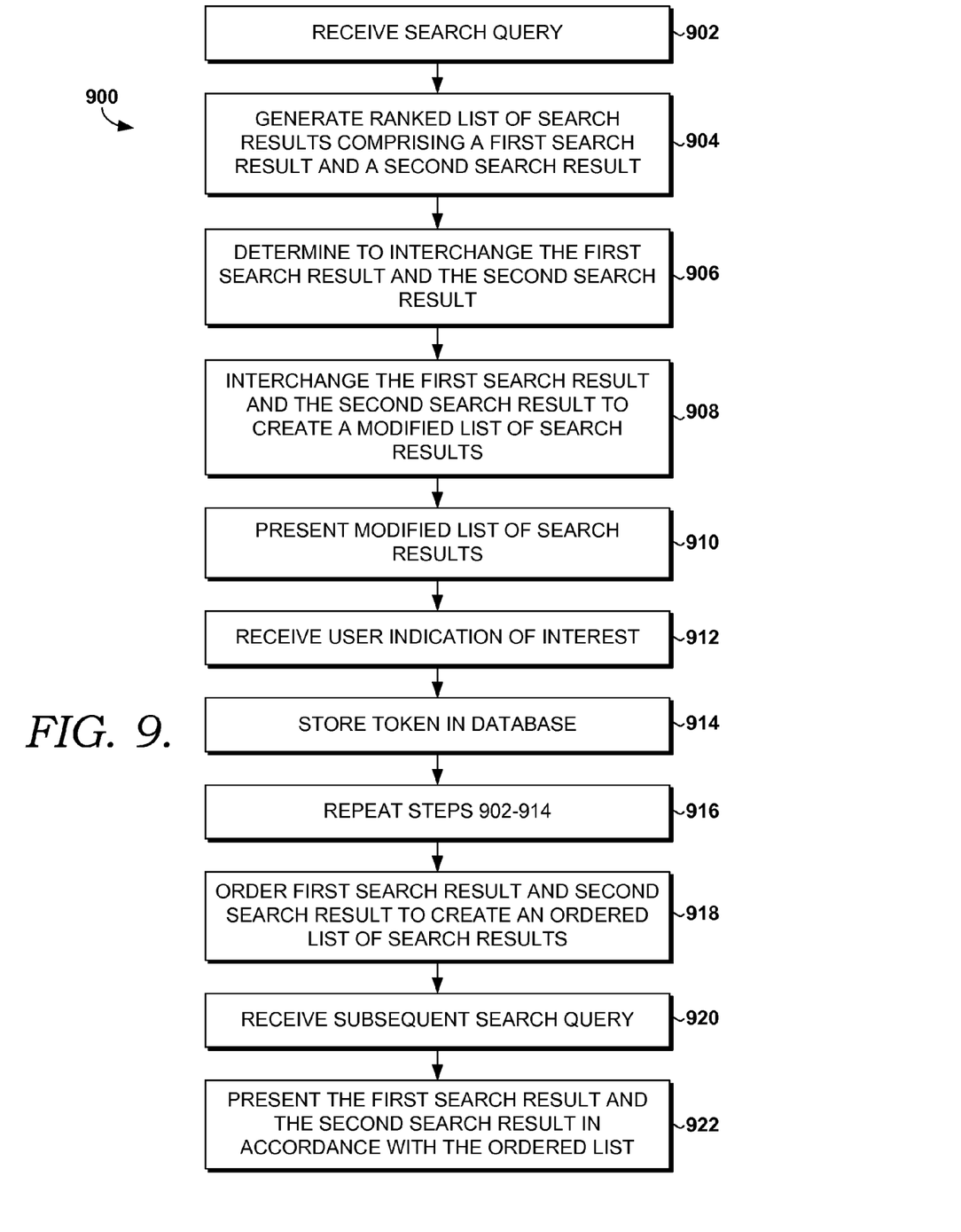
FIG. 9 is a flow diagram illustrating a method for presenting search results ordered, in part, using user preferences, in accordance with an embodiment of the present invention.

With reference now to FIG. 9, a flow diagram is illustrated that shows a method 900 for presenting search results ordered, in part, using user preference data, in accordance with an embodiment of the present invention. As indicated at block 902, a search query is received (e.g., utilizing search engine 202 of FIG. 2). A ranked list of search results is generated (for instance, utilizing search engine 202 of FIG. 2) in response to the search query, such that the ranked list of search results includes a first search result and a second search result, as shown at block 904. As indicated at block 906, it is determined to interchange the order of the first search result and the second search result for presentation. The order of the first search result and the second search result are interchanged, as shown at block 908, to create a modified list of search results. The modified list of search results is presented, as shown at block 910 (for instance, on a display screen associated with user device 206 of FIG. 2).

As indicated at block 912, a user indication of interest is received (for instance, by search engine 202 of FIG. 2). A token associated with the user indication of interest is the stored in a database (e.g., data store 208 of FIG. 2), as shown at block 914. Blocks 902-914 are repeated, as shown at block 916. The first search result and the second search result are ordered based on analyzing stored tokens to create an ordered list of search results, as shown at block 918. This ordering may be performed, for instance, utilizing search engine 202 of FIG. 2. A subsequent search query is received (e.g., by search engine 202 of FIG. 2), as shown at block 920. As indicated at block 922, at least one of the first search result and the second search result is presented in accordance with the ordered list of search results, for instance, on a display screen associated with user device 206 of FIG. 2.

To further illustrate, at block 902 a search query for "Rick Astley" may be received. A ranked list of search results may then be generated in response thereto, as shown at block 904. This ranked list of search results may comprise, for example, search result X and search result Y. Each of these search results will be positioned within the ranked list of search results as ranked by a ranking algorithm—for example, search result X may be in the second position while search result Y may be in the third position based on the strength of keyword match. At block 906, it may be determined to interchange the order of search result X and search result Y. It should be noted that this may be determined to happen with fifty percent probability, such that fifty percent of the time the rank of search result X and search result Y may not be interchanged. Probabilistically interchanging the position of search result X and search result Y for presentation allows for experiments to be run to obtain position-bias-free user preferences for this pair of search results. At block 908, the order of search result X and search result Y may be interchanged, such that search result Y is presented in the second position and search result X is in the third position within the list of search results. Such creates a modified list of search results— modified with respect to the list as ranked by the ranking algorithm alone. At block 910, the modified list of search results may be presented.

As indicated at block 912 a user indication of interest is received. For example, a user may click on search result X. This click-data is received. A token associated with this user indication of interest is stored in a database, as shown at block 914. At block 916, blocks 902-914 are repeated. Since, in this example, it was probabilistically determined to interchange the position of search result X and search result Y, sometimes the list of search results presented at block 910 will be the ranked list of search results having search result X ranked higher than search result Y, while sometimes the list of search results presented as shown at block 910 will be the modified list of search results having search result Y ranked higher than search result X. Again, this allows for position-bias-free user preferences to be obtained. As indicated at block 918, search result X and search result Y are ordered based on analyzing stored tokens. For example, if ninety-three percent of users have clicked on search result X when it was presented higher and lower than search result Y, it may be determined that users prefer search result X. Thus, search result X may be ordered higher than search result Y, as indicated at block 918. Note that this ordering is based upon the user preference data obtained and not on the order determined by the ranking algorithm although, in this case, the two orderings would be the same.

As indicated at block 920, a subsequent search query is received. This second search query may be identical to the first search query, in this example "Rick Astley." Alternatively, the second search query may include the first search query, such as "Rick Astley rickroll." In still another alternative, the second search query may relate to the first search query, or could include alternative spellings or misspellings of the first search query, such as "Rick Astly," "Rric Astley," or "Never gonna give you up, never gonna let you down." These examples illustrate that the first and second search queries may be identical, substantially similar, or related in certain embodiments. As indicated at block 922, at least one of the search result X and search result Y is presented. For example, the search result X may be presented alone or with other search results because users expressed a preference for it. Alternatively, search result X may be presented along with search result Y but positioned higher on the search results page. In still another alternative, search result Y might be presented but not search result X, perhaps because the user requested the search results be presented in reverse order of user preference.

Figure 10:
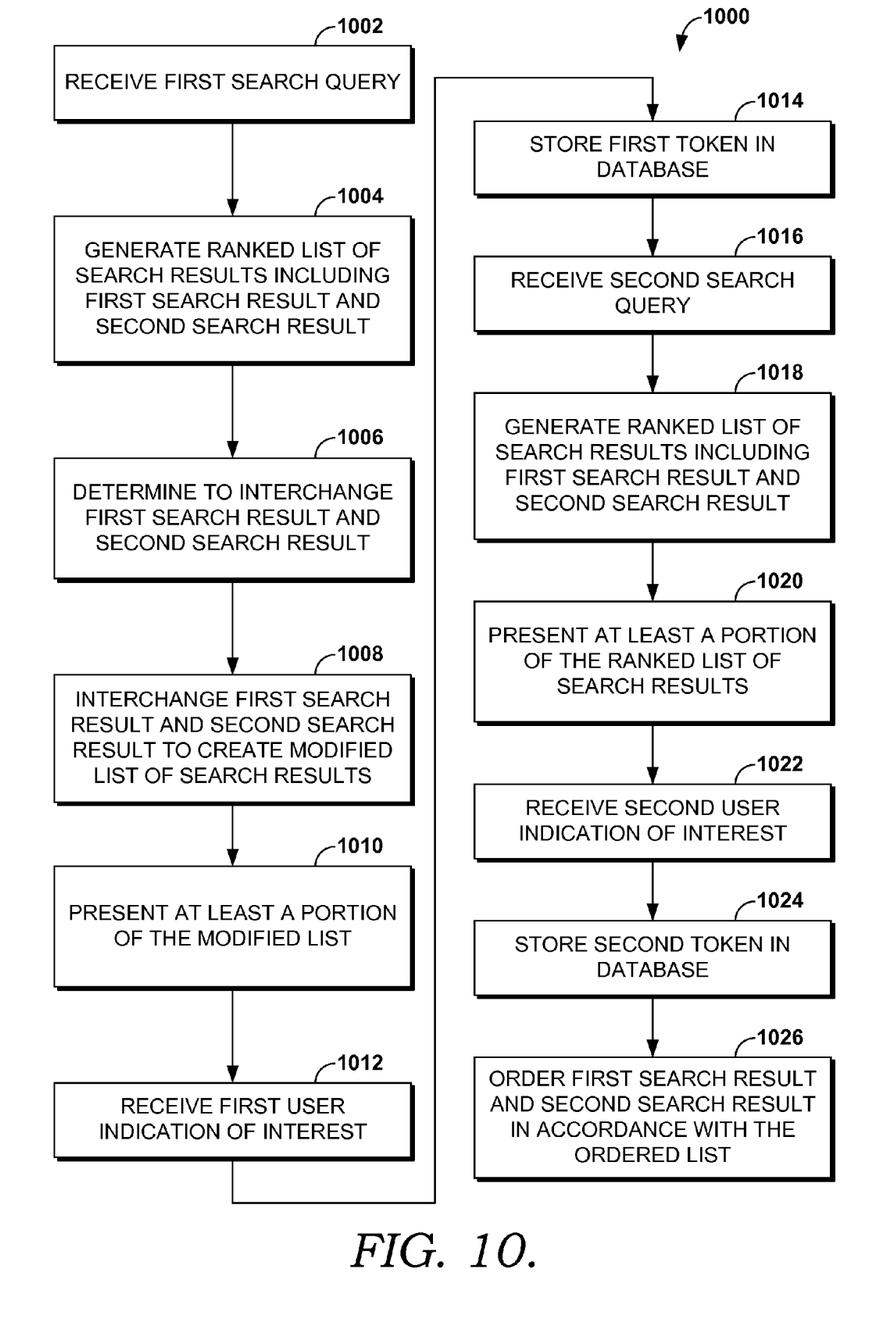
FIG. 10 is a flow diagram illustrating a method for determining search results for presentation ordered, in part, using user preferences, in accordance with an embodiment of the present invention.

Turning now to FIG. 10, a flow diagram is illustrated that shows a method 1000 for determining search results ordered, in part, based upon user preference data, in accordance with an embodiment of the present invention. As indicated at block 1002, a first search query is received in a first search session (for instance, utilizing search engine 202 of FIG. 2). The first search query includes at least one search term. A ranked list of search results is generated in response to the first search query, the ranked list including the first search result and the second search result, as shown at block 1004. The ranked list is generated utilizing at least one ranking algorithm, for instance, associated with search engine 202 of FIG. 2. It is next determined to interchange the order of the first search result and the second search result, as shown at block 1006. The order of the first and second search results is then interchanged to create a modified list of search results, as indicated at block 1008. As indicated at block 1010, at least a portion of the modified list of search results is presented, e.g., in association with a display device associated with user device 206 of FIG. 2.

A first user indication of interest is received, as indicated at block 1012. The first user indication of interest is associated with either the first search result or the second search result presented in accordance with the modified list of search results. As indicated at block 1014, a first token indicative of at least the user indication of interest is stored in a database, e.g., data store 208 of FIG. 2. As indicated at block 1016, a second search query is received (e.g., at search engine 202 of FIG. 2) in a second search session. The second search query includes the at least one search term. As indicated at block 1018, the ranked list of search results including the first search result and the second search result is generated. As indicated at block 1020, the ranked list of searched results is presented in the second search session. A second user indication of interest is received, as indicated at block 1022. A second token in stored in a database (e.g., data store 208 of FIG. 2), as shown at block 1024. As shown at block 1026, the first search result and the second search result are ordered based on analyzing the first token and the second token to create an ordered list of search results. The ordered list of search results is based, at least in part, on the user preference data obtained and evidenced by the stored tokens.

For example, as indicated at block 1002 the search query "Tom Waits" may be received in a first search session. In this case, a "search session" includes submitting a search query and subsequent behavior, including, for example, generating search results, ranking/ordering search results, presenting search results, receiving user indications of interest in one or more search results, etc. As indicated at block 1004, a ranked list of search results is generated, including, for example, search result S and search result T. In this example, search result S and search result T are juxtaposed at the first position and the second position within the ranked list of search results. As shown at block 1006, it is determined to interchange the order of search result S and search result T to create a modified list of search results. Again, it should be noted that this may be a probabilistic determination or an alternating determination, as described above. As shown at block 1008, the order of search result S and search result T are interchanged, such that search result T and search result S are juxtaposed at the second position and the first position within the modified list of search results. At least a portion of the modified list of search results is presented in the first session, the portion including search result T and search result S, as shown at block 1010. At block 1012, a first user indication of interest is received. For example, a user in the first session may hover the cursor over search result T, which is sent over the internet and received.

A second search query is received in a second search session, as shown at block 1016. For example, the same user from the first search session may have entered a second search query, instantiating a second search session. Alternatively, a second user may have accessed the search engine and entered a search query. In either scenario, the second search query includes at least one common or substantially similar term as the first search query. As shown at block 1018, the ranked list of search results is generated in the second search session including the search result S and search result T. At least a portion of the ranked list of search results including the first search result and the second search result is presented in the second search session, as shown at block 1020. A second user indication of interest is received at block 1022. For example, hovering behavior over search result T may be received. A token, associated with the second user indication of interest, is stored in a database at block 1024. It should be noted that a token may include information related to a search result (including the first search result and the second search result), the relative position of the first search result and second search result as presented in the first search session, the search query, etc.

At block 1026, the first search result and the second search result are ordered based on analyzing the first token and the second token. For example, the first indication of user interest and the second user indication of interest are associated with search result T. This may cause search result T to be positioned higher than search result S for presentation. These orderings may be stored or later utilized for presentation, such that presented search results are ordered according to user preferences. Again, in certain embodiments, search results ordered according to user preference may be interspersed with search results ranked according to keyword match, link weighting, etc., as determined by at least one ranking algorithm. Experiments may be conducted on these blended ranked and ordered lists of search results, allowing user-preference-ordered search results to be blended according to constraints while obtaining additional position-bias-free user preference data for search results not having the quantity of data necessary to allow for confident ordering based on user preferences alone.

It should be noted that in certain embodiments the above steps may be iteratively repeated to gather additional position-bias-free user preferences such that confidence in user-preference based orderings can be increased. For example, experiments with a certain pair of search results could be repeatedly conducted numerous times to increase the certainty that users prefer one of the pair to the other. It should also be noted that a blended ranked and ordered list of search results may be generated that includes search results ordered by position-bias-free user preference alone, ranking algorithms that utilizing position-bias-free user preference in conjunction with other ordering criteria, and ranking algorithms that utilize ranking criteria other than position-bias-free user preferences. In certain embodiments, a ranking algorithm comprising a neural network may be trained utilizing position-bias-free user preferences, and the resulting rankings may be blended with orderings generated utilizing only position-bias-free user preferences. Position-bias-free user preferences may be obtained utilizing this blended ranked and ordered list. It may also be possible to generate lists of search results using only position-bias-free user preference data, reducing the need to rely on keyword matching, link weighting, etc to rank search results.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media storing computer-useable instructions that, when executed by a computing device, perform a method for presenting search results ordered using user preference data, the method comprising:
    receiving a search query;
    generating a ranked list of search results in response to the search query, the ranked list of search results comprising a first search result and a second search result;
    obtaining position-bias-free user preference data for the first and second search results that overrides ranks assigned to the first and second search results;
    retrieving relative positions of pairs of historical search results having the first and second search results, wherein the pairs are ranked ordered according to user indications of interest;
    modifying the ranked order of the first and second search results relative to each other based on the position-bias-free user preference data and the relative positions of the pairs of historical search results; and
    presenting at least a portion of the ranked list of search results, the portion including the first and second search results with the modified ranked order.

2. The one or more computer-storage media of claim 1, wherein obtaining the position-bias-free user preference data comprises:
    receiving an initial search query, wherein the initial search query is the same as the received search query;
    generating the ranked list of search results in response to the initial search query;
    presenting the first and second search results in accordance with the ranked list of search results; and
    receiving a first user indication of interest associated with one of the first and second search results presented in accordance with the ranked order, wherein the position-bias-free user preference data includes the first user indication of interest.

3. The one or more computer-storage media of claim 2, wherein obtaining the position-bias-free user preference data further comprises:
    receiving a subsequent search query, wherein the subsequent search query is the same as the initial search query;
    generating the ranked list of search results in response to the subsequent search query;
    interchanging the first and second search results to create an ordered list of search results;
    presenting the first and second search results in accordance with the ordered list of search results; and
    receiving a second user indication of interest associated with one of the first and second search results presented in accordance with the ordered list, wherein the position-bias-free user preference data includes the second user indication of interest.

4. The one or more computer-storage media of claim 3, wherein each of the first and second user indications of interest comprise one or more of:
    selection data;
    hover behavior; and
    gaze information.

5. The one or more computer-storage media of claim 3, wherein obtaining the position-bias-free user preference data further comprises storing a token in a database, the token being indicating one or more of:
    an association of the first user indication of interest and the associated one of the first and second search results;
    an association of the second user indication of interest and the associated one of the first and second search results;
    a relative position of the first and second search results as presented;
    the initial search query; and
    the subsequent search query.

6. The one or more computer-storage media of claim 1, further comprising:
    obtaining a certainty of the position-bias-free user preference data; and
    determining to order the first and second search results relative to each other based on the certainty of the position-bias-free user preference data.

7. The one or more computer-storage media of claim 6, wherein the certainty of the position-bias-free user preference data is based, at least in part, on a quantity of received user indications of interest.

8. A computer-implemented method for presenting search results ordered using user preference data, the method comprising:
    receiving a search query;
    generating a ranked list of search results in response to the search query, the ranked list of search results comprising a first search result and a second search result;
    obtaining position-bias-free user preference data for the first and second search results that overrides ranks assigned to the first and second search results;
    retrieving relative positions of pairs of historical search results having the first and second search results, wherein the pairs are ranked ordered-according to user indications of interest;
    modifying the ranked order of the first and second search results relative to each other based on the position-bias-free user preference data and the relative positions of the pairs of historical search results; and
    presenting at least a portion of the ranked list of search results, the portion including the first and second search results with the modified ranked order.

9. The method of claim 8, wherein obtaining the position-bias-free user preference data comprises:
    receiving an initial search query, wherein the initial search query is the same as the received search query;
    generating the ranked list of search results in response to the initial search query;
    presenting the first and second search results in accordance with the ranked list of search results; and receiving a first user indication of interest associated with one of the first and second search results presented in accordance with the ranked order, wherein the position-bias-free user preference data includes the first user indication of interest.

10. The method of claim 9, wherein obtaining the position-bias-free user preference data further comprises:
receiving a subsequent search query, wherein the subsequent search query is the same as the initial search query;
generating the ranked list of search results in response to the subsequent search query;
interchanging the first and second search results to create an ordered list of search results;
presenting the first and second search results in accordance with the ordered list of search results; and
receiving a second user indication of interest associated with one of the first and second search results presented in accordance with the ordered list, wherein the position-bias-free user preference data includes the second user indication of interest.

11. The method of claim 10, wherein each of the first and second user indications of interest comprise one or more of:
selection data;
hover behavior; and
gaze information.

12. The method of claim 10, wherein obtaining the position-bias-free user preference data further comprises storing a token in a database, the token being indicating one or more of:
an association of the first user indication of interest and the associated one of the first and second search results;
an association of the second user indication of interest and the associated one of the first and second search results;
a relative position of the first and second search results as presented;
the initial search query; and
the subsequent search query.

13. The method of claim 8, further comprising:
obtaining a certainty of the position-bias-free user preference data; and
determining to order the first and second search results relative to each other based on the certainty of the position-bias-free user preference data.

14. The method of claim 13, wherein the certainty of the position-bias-free user preference data is based, at least in part, on a quantity of received user indications of interest.

15. A computer system having hardware computer storage media and computer processors configured to perform a method for presenting search results ordered using user preference data, the method comprising:
receiving a search query;
generating a ranked list of search results in response to the search query, the ranked list of search results comprising a first search result and a second search result;
obtaining position-bias-free user preference data for the first and second search results that overrides ranks assigned to the first and second search results;
retrieving relative positions of pairs of historical search results having the first and second search results, wherein the pairs are ranked ordered according to user indications of interest;
modifying the ranked order of the first and second search results relative to each other based on the position-bias-free user preference data and the relative positions of the pairs of historical search results; and
presenting at least a portion of the ranked list of search results, the portion including the first and second search results-with the modified ranked order.

16. The computer system of claim 15, wherein obtaining the position-bias-free user preference data comprises:
receiving an initial search query, wherein the initial search query is the same as the received search query;
generating the ranked list of search results in response to the initial search query;
presenting the first and second search results in accordance with the ranked list of search results; and
receiving a first user indication of interest associated with one of the first and second search results presented in accordance with the ranked order, wherein the position-bias-free user preference data includes the first user indication of interest.

17. The computer system of claim 16, wherein obtaining the position-bias-free user preference data further comprises:
receiving a subsequent search query, wherein the subsequent search query is the same as the initial search query;
generating the ranked list of search results in response to the subsequent search query;
interchanging the first and second search results to create an ordered list of search results;
presenting the first and second search results in accordance with the ordered list of search results; and
receiving a second user indication of interest associated with one of the first and second search results presented in accordance with the ordered list, wherein the position-bias-free user preference data includes the second user indication of interest.

18. The computer system of claim 17, wherein each of the first and second user indications of interest comprise one or more of:
selection data;
hover behavior; and
gaze information.

19. The computer system of claim 17, wherein obtaining the position-bias-free user preference data further comprises storing a token in a database, the token being indicating one or more of:
an association of the first user indication of interest and the associated one of the first and second search results;
an association of the second user indication of interest and the associated one of the first and second search results;
a relative position of the first and second search results as presented;
the initial search query; and
the subsequent search query.

20. The computer system of claim 15, further comprising:
obtaining a certainty of the position-bias-free user preference data; and
determining to order the first and second search results relative to each other based on the certainty of the position-bias-free user preference data.

21. The computer system of claim 20, wherein the certainty of the position-bias-free user preference data is based, at least in part, on a quantity of received user indications of interest.

* * * * *